(12) United States Patent
Lim et al.

(10) Patent No.: US 6,704,364 B1
(45) Date of Patent: Mar. 9, 2004

(54) METHOD AND APPARATUS FOR GENERATING A PLURALITY OF CRC DIGITS FOR DATA PACKETS HAVING DIFFERENT PRESCRIBED NETWORK PROTOCOLS USING ONE CRC GENERATOR

(75) Inventors: Alvin Swee Hock Lim, Toa Payoh (SG); Jeffrey Dwork, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/536,606

(22) Filed: Mar. 28, 2000

Related U.S. Application Data

(60) Provisional application No. 60/173,485, filed on Dec. 29, 1999.

(51) Int. Cl.[7] .............................. H04B 3/00; H04L 25/00
(52) U.S. Cl. ....................................................... 375/257
(58) Field of Search .................................. 375/211, 257, 375/240.01, 222, 260; 370/419, 293, 362, 335, 255, 412, 401, 392; 714/758

(56) References Cited

U.S. PATENT DOCUMENTS 6,226,771 B1 * 5/2001 Hilla et al. .................. 714/758
6,295,281 B1 * 9/2001 Itkowsky et al. ........... 370/293

\* cited by examiner

*Primary Examiner*—Stephen Chin
*Assistant Examiner*—Curtis Odom

(57) ABSTRACT

A network interface that can converts frame data into a data packet which is sent from one local area network to another local area network in which the two local area networks operate using different prescribed network protocols. The network interface receives frame data from a transmit buffer and converts the frame data into a first data packet having a first prescribed network protocol and where the data packet includes first CRC digits. Logic converts the first data packet into a converted data packet having a second prescribed network protocol, which is different than the first prescribed network protocol. The converted data packet also includes second CRC digits which were generated based on the converted data packet at well as being generated by the same CRC generator that generated the first CRC digits.

7 Claims, 3 Drawing Sheets

METHOD AND APPARATUS FOR GENERATING A PLURALITY OF CRC DIGITS FOR DATA PACKETS HAVING DIFFERENT PRESCRIBED NETWORK PROTOCOLS USING ONE CRC GENERATOR

This application claims priority from U.S. Provisional Patent Application Serial No. 60/173,485, filed Dec. 29, 1999, which is incorporated herein by reference.

TECHNICAL FIELD

The present invention relates to a network interface for converting frame data into a data packet having a prescribed network protocol, more particularly to an arrangement where the network interface converts a data packet having a first prescribed network protocol into a converted data packet having a second prescribed network protocol where the data packets include first cyclic redundancy check digits and second cyclic redundancy check digits, respectively, which were generated by the same cyclic redundancy check generator.

BACKGROUND ART

Local area networks use network cables or other network media to link different nodes (e.g., computers, workstations, and servers) across a common network. Local area networks allow different nodes to access other nodes having common peripheral devices (e.g. printers, servers, and modems). Each local area network architecture uses a media access controller (MAC) enabling network interface device (NID) at each network node to share access to the network media. In order to control the operation of the network, the network operates under some form of a standard or protocol, such as an Ethernet protocol.

Traditional Ethernet networks (10BASE-T) operate at 10 Mb/s Ethernet protocol, as described by IEEE Standard 802.3; the majority of Ethernet interfaces currently operate at this data rate. However, a newer Ethernet standard, under IEEE standard 802.3u, accomplishes the faster operation of 100 BASE-T systems, at a 100 Mb/s data rate (i.e., a 125 Mb/s encoded bit rate) using unshielded twisted pair (UTP) physical media. The 100 BASE-T standard defines operation over two pairs of category 5 UTP (100 BASE-TX) and over four pairs of category 3 UTP. The 100 BASE-FX network medium, covered by the 100 BASE-T standard, allows operation over dual fiber optic cabling.

In order to transfer information between nodes in a local area network, data packets are sent. Data packets typically contain a destination address, a source address, a length parameter, data, and cyclic redundancy check (CRC) digits. The destination address and source address parameters indicate the addresses of where the data is being sent from and where the data is being sent to, respectively. The length parameter indicates the length of the data packet. In an Ethernet system, the length can vary from 46 to 1500 bytes. The CRC digits are used to determine if errors occurred in the transmission of the data packet.

In order to transfer data packets between nodes in different local area networks where each of the networks operates according to different prescribed network protocols, the network interface in the first or source local area network converts the data packet into the prescribed network protocol of the second or destination local area network. The first local area network transmits the converted data packet to the second local area network via a backbone. Backbones are used to connect two or more local area networks, allowing data packets to be transmitted between the local area networks.

FIG. 1 illustrates a network interface 10 for converting frame data into a data packet having the prescribed network protocol of the second local area network according to the prior art. A media access controller (MAC) 14 in the network interface 10 receives frame data from a transmit buffer 12. The MAC 14 converts the frame data into a first data packet having a first prescribed network protocol. A first CRC generator 16 in the MAC 14 generates first CRC digits based on the frame data and using coefficients for the first prescribed network protocol 18. The MAC 14 incorporates the CRC digits into the first data packet and sends the first data packet to the logic 20.

The logic 20 converts the first data packet into a converted data packet having a second prescribed network protocol 24. In order to ensure against any errors that occur during transmission, a second CRC generator 22 generates second CRC digits based on the converted data packet and using coefficients for the second prescribed network protocol 24. The logic 20 modifies the converted data packet by replacing the first CRC digits with the second CRC digits. The converted data packet is transmitted by a media independent interface (MII) 26 for transmission onto a backbone via a backbone interface. The backbone is used to transmit the converted data packet to the other local area network, i.e., second or destination local area network.

Requiring the additional CRC generator for generating the second CRC digits requires additional space, which increases the size of the network interface. As a result, if the network interface is manufactured as a single device, the second CRC generator increases the size of the device. Moreover, the second CRC generator is not necessary since the first CRC generator can produce CRC digits having different prescribed network protocols.

SUMMARY OF THE INVENTION

There is a need for converting a first data packet having a first prescribed network protocol, where the first data packet includes a first cyclic redundancy check (CRC) digits into a converted data packet having a second prescribed network protocol, where the second data packet includes second CRC digits.

There is also a need for generating second CRC digits using the same CRC generator that generates the first CRC digits.

These and other needs are obtained by the present invention, where a network interface comprises a media access controller (MAC) having a CRC generator configured for generating CRC digits according to different prescribed network protocols, allowing a network interface to transmit a converted data packet in a second prescribed network protocol in response to frame data by a network interface.

According to one aspect of the present invention, a network interface includes a MAC configured for outputting a data packet having a first prescribed network protocol based on a received frame data, where the data packet includes first CRC digits. The MAC includes a CRC generator configured for generating the first CRC digits based on the received frame data. The network interface includes logic configured for converting the data packet in the first prescribed network protocol into a converted data packet having a second prescribed network protocol and second CRC digits generated by the CRC generator. The logic replaces the first CRC digits with the second CRC digits. By using the CRC generator in the MAC, the logic does not require an additional CRC generator to generate the second CRC digits. Moreover, by not requiring the additional CRC generator, the network interface does not need to allocate the space for the additional CRC generator, thereby reducing the overall size of the network interface.

Another aspect of the present invention provides a method for generating CRC digits in a MAC. The method includes receiving a data packet, having a first prescribed network protocol and having CRC digits, by logic from a MAC. A CRC generator in the MAC is configured for generating the first CRC digits based on received frame data. The logic converts the data packet in the first prescribed network protocol into a second prescribed network protocol and provides information relating to the converted data packet to the CRC generator. The CRC generator generates the second CRC digits in response to the information relating to the converted data packet. The logic modifies the converted data packet by replacing the first CRC digits with the second CRC digits. By converting the data packet having a first prescribed network protocol into a data packet having a second prescribed network protocol, the converted data packet can be transmitted to a local area network via a backbone, where the local area network operates according to the second prescribed network protocol. Moreover, the second prescribed network protocol can be a non-IEEE prescribed network protocol.

Additional advantages and novel features of the invention will be set forth in part in the description which follows, and in part will become apparent to those skilled in the art upon examination of the following or may be realized and attained by means of the instrumentalities and combinations particularly pointed out in the appended claims.

BRIEF DESCRIPTION OF THE DRAWINGS

Reference is made to the attached drawings, wherein the elements having the same reference numeral designations represent like elements throughout and wherein.

DETAILED DESCRIPTION OF THE INVENTION

Figure 1:
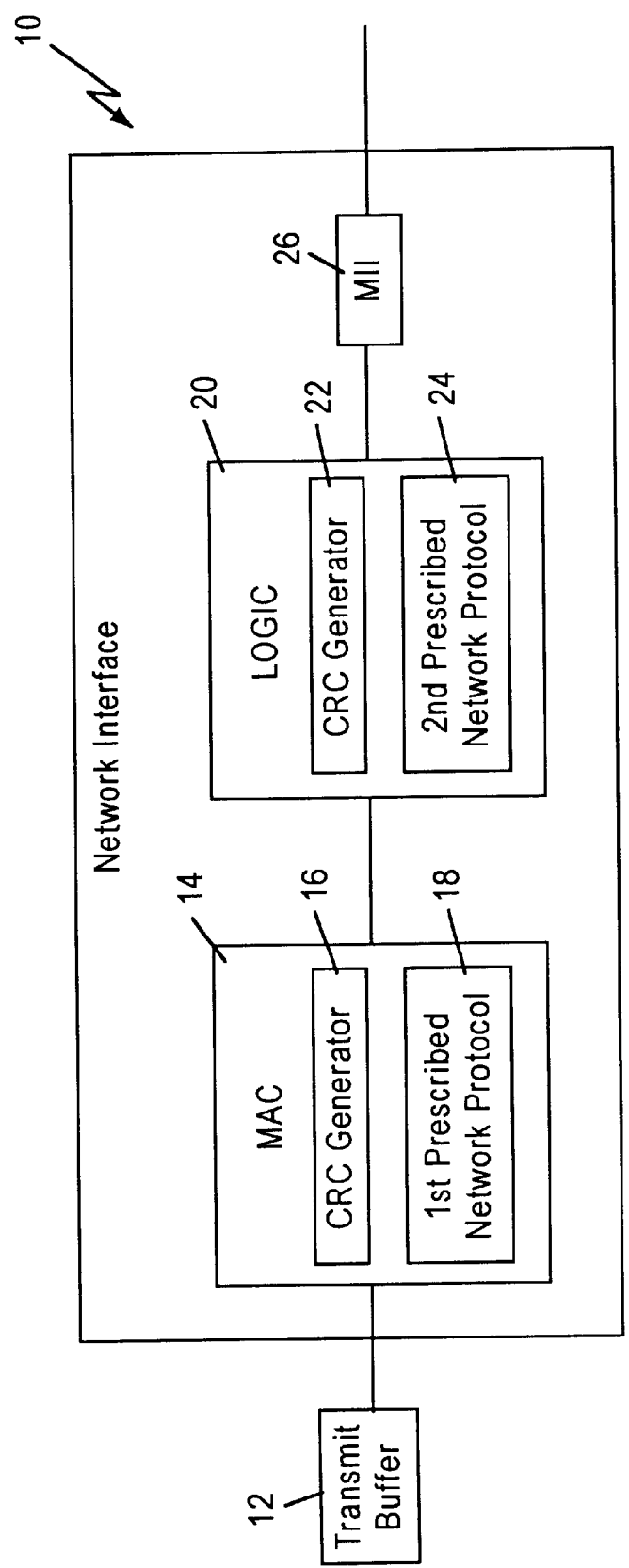
FIG. 1 is a block diagram of an exemplary network interface according to prior art.
Figure 2:
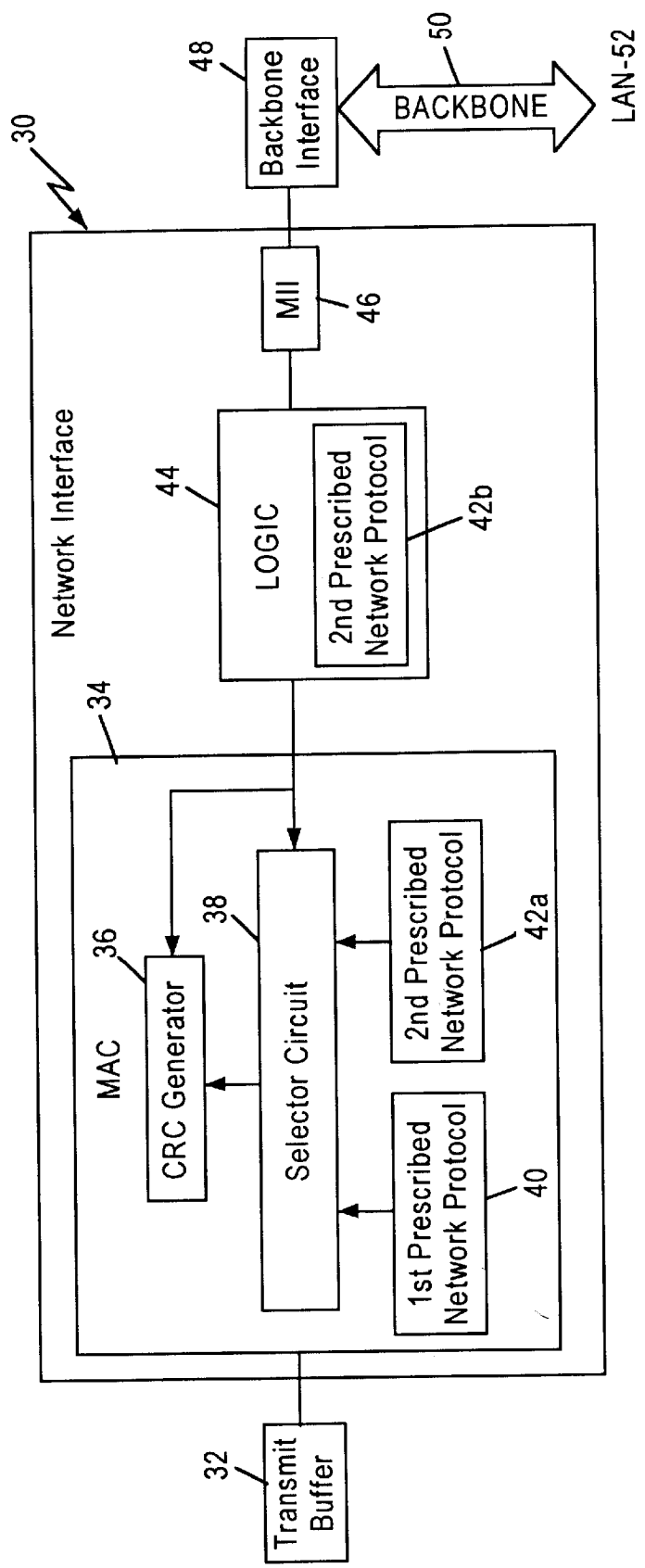
FIG. 2 is a block diagram of a network interface according to an embodiment of the present invention.

FIG. 2 is a block diagram of an exemplary network interface 30 in a local area network according to the preferred embodiment of the present invention. The network interface 30 receives frame data and outputs a converted data packet having a prescribed network protocol, where the converted data packet includes cyclic redundancy check (CRC) digits. The network interface 30 includes a media access controller (MAC) 34 and logic 44. The MAC 34 receives frame data from a transmit buffer 32 and converts the frame data into a first data packet according to a first prescribed network protocol 40.

The MAC 34 includes a CRC generator 36 configured for generating CRC digits. The CRC generator 36 generates first CRC digits based on the received frame data and coefficients from first prescribed network protocol 40. Selector circuit 38 provides the CRC generator 36 the coefficients for the first prescribed network protocol 40. The coefficients for the first prescribed network protocol 40 are stored in non-volatile register elements, such as non-volatile random access memory (NVRAM) or electronically erasable programmable read only memory (EEPROM). Typically, the first prescribed network protocol 40 is compliant with the IEEE 802.3 network protocol, which is for Ethernet based data.

The MAC 34 incorporates the first CRC digits into the first data packet and outputs the first data packet to logic 44. Logic 44 converts the received data packet into a converted data packet having a second prescribed network protocol 42b. Logic 44 provides information relating to the converted data packet to the CRC generator 36 and a selector circuit 38. In response to the information, the selector circuit 38 provides the coefficients for the second prescribed network protocol 42a to the CRC generator 36 in order to generate the second CRC digits. The coefficients for the second prescribed network protocol 42a are stored in non-volatile register elements, such as non-volatile random access memory (NVRAM) or electronically erasable programmable read only memory (EEPROM). Typically, the second prescribed network protocol 42a, 42b is a network protocol that is not compliant with IEEE 802.3 network protocol.

The MAC 34 sends the CRC digits to logic 44, which replaces the first CRC digits with the second CRC digits in the converted data packet. The converted data packet is then in the proper format for transmission. The logic 44 outputs the converted data packet to a media independent interface (MII) 46 for transmitting the converted data packet onto a backbone 50 via a backbone interface 48. The backbone 50 is used to transmit the converted data packet to the other local area network, i.e., second or destination local area network 52 via a backbone link (not shown).

Figure 3:
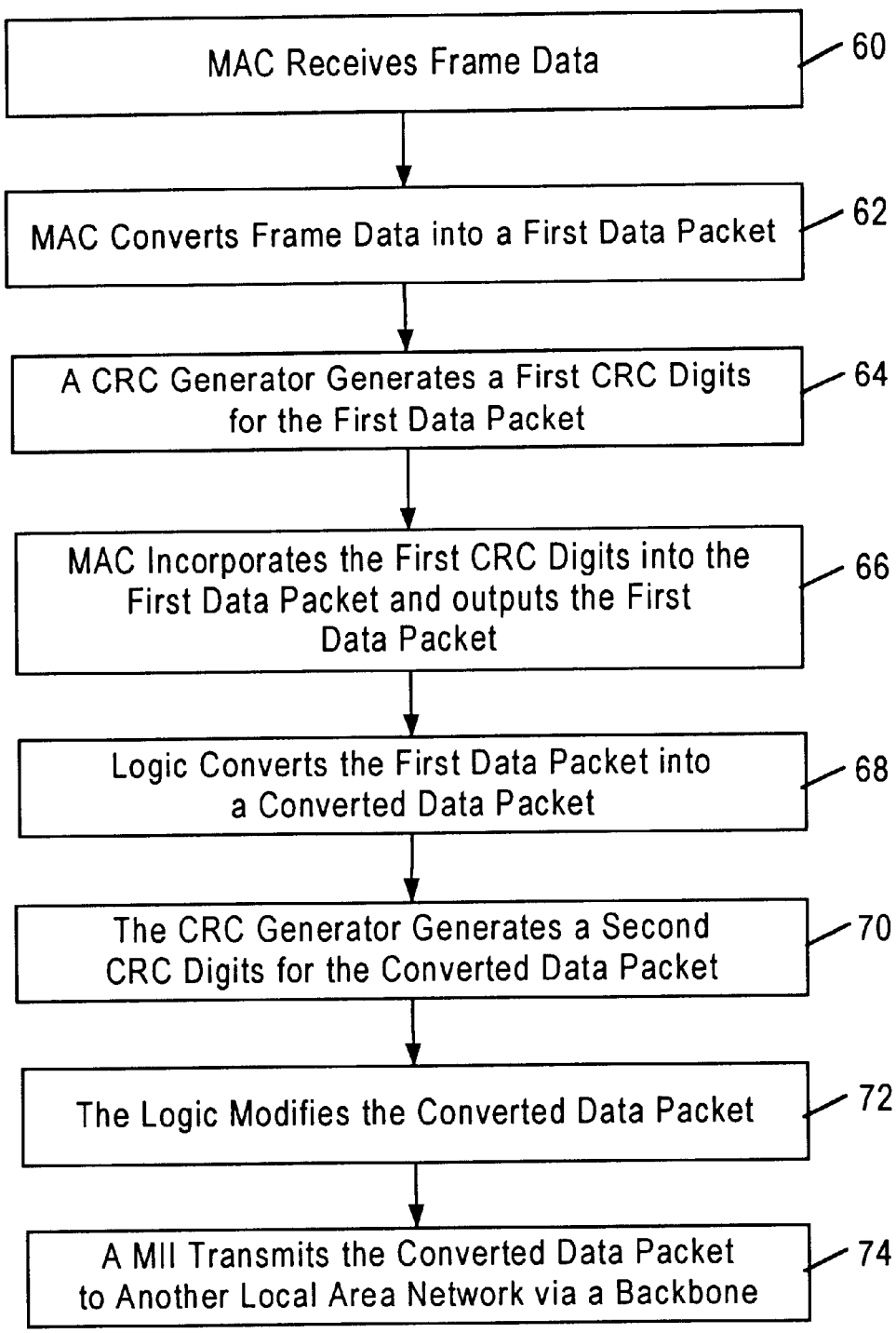
FIG. 3 is a flow diagram illustrating the method for converting a first data packet having first CRC digits into a second data packet having second CRC digits.

FIG. 3 is a block diagram of an illustrating the steps of the method for generating CRC digits in a MAC. The method starts with a MAC in a network interface receiving frame data from a transmit buffer 60. The MAC converts the frame data into a first data packet having a first prescribed network protocol 62. A CRC generator in the MAC generates first CRC digits based on the frame data and coefficients for the first prescribed network protocol 64. The MAC incorporates the first CRC digits to the data packet and outputs the data packet to logic 66. The logic converts the data packet into a converted data packet 68. The converted data packet is converted according to a second prescribed network protocol. The CRC generator generates second CRC digits based on the converted data packet and coefficients for the second prescribed network protocol 70. The logic then modifies the converted data packet by replacing the first CRC digits with the second CRC digits 72. The converted data packet is transmitted by a MII to a backbone interface and onto a backbone to another local area network via a backbone link 74.

The disclosed embodiment allows for a network interface to convert frame data into a first data packet having a first prescribed network protocol, such as IEEE 802.3 protocol, and then convert the first data packet into a converted data packet having a second prescribed network protocol, where the first data packet and the converted data packet include first and second CRC digits, respectively, which were generated by the same CRC generator in the MAC thereby not requiring an additional CRC generator to generate the second CRC digits.

While this invention has been described in connection with what is presently considered to be the most practical and preferred embodiments, it is to be understood that the invention is not limited to the disclosed embodiments, but, on the contrary, is intended to cover various modifications and equivalent arrangements includes within the scope of the appended claims.

We claim:

1. A network interface comprising:
   a media access controller configured for outputting a data packet having a first prescribed network protocol based on a received frame data, where the data packet includes a first cyclic redundancy check character, the media access controller comprising a cyclic redundancy check generator configured for generating the first cyclic redundancy check character based on the received frame data;
   logic configured for converting the data packet in the first prescribed network protocol into a converted data packet having a second prescribed network protocol and a second cyclic redundancy check character generated by the cyclic redundancy check generator, the logic replacing the first cyclic redundancy check character with the second cyclic redundancy character; and
   a media independent interface configured for receiving the converted data packet from the logic and transmitting the converted data packet.

2. The network interface of claim 1, further comprising a backbone interface configured for transmitting the converted data packet from the media independent interface to another local area network via a backbone link.

3. The network interface of claim 1, wherein the first prescribed network protocol is compliant with IEEE 802.3 network protocol.

4. The network interface of claim 1, wherein the media access controller further comprises a selector circuit configured for supplying coefficients for a prescribed network protocol to the cyclic redundancy check generator for generating the cyclic redundancy check digits.

5. A method for generating a cyclic redundancy check character in a media access controller, comprising:
   receiving a data packet, having a first prescribed network protocol and having a first cyclic redundancy check character, by logic from a media access controller, where a cyclic redundancy check generator in the media access controller is configured for generating the first cyclic redundancy check character based on received frame data;
   converting the data packet in the first prescribed network protocol into a second prescribed network protocol by the logic;
   providing information relating to the converted data packet to the cyclic redundancy check generator;
   generating a second cyclic redundancy check character in response to the information relating to the converted data packet;
   modifying the converted data packet by replacing the first cyclic redundancy check character with the second cyclic redundancy check character; and
   transmitting the modified converted data packet having the second cyclic redundancy check character via a media independent interface.

6. The method of claim 5, further comprising transmitting the converted data packet from the media independent interface onto a backbone to another local area network via a backbone link.

7. The method of claim 5, wherein providing information relating to the converted data packet to the cyclic redundancy check generator further comprises supplying coefficients for the second prescribed network protocol to the cyclic redundancy check generator.

* * * * *